3,557,235
PRODUCTION OF ETHYLBENZENE AND BENZENE FROM TOLUENE
Joseph Peter Henry and Fred Noble Hill, South Charleston, and Roger Harry Garst, St. Albans, W. Va., assignors to Union Carbide Corporation, New York, N.Y., a corporation of New York
No Drawing. Filed Dec. 27, 1968, Ser. No. 787,621
Int. Cl. C07c 15/04
U.S. Cl. 260—668                    8 Claims

ABSTRACT OF THE DISCLOSURE

Ethylbenzene and benzene are produced from toluene by a unique process which comprises first coupling the toluene in the presence of a catalyst and in the vapor phase to produce bibenzyl and stilbene. The oxidatively coupled products are then diluted with benzene and catalytically hydrodealkylated to produce ethylbenzene and benzene as the ultimate major products.

---

The present invention relates to a novel and unique process for the production of ethylbenzene and benzene from toluene as the starting hydrocarbon. It is particularly related to a process for the ultimate production of ethylbenzene and benzene by the oxidative coupling of toluene to produce bibenzyl and stilbene as the principal products followed by the hydrodealkylation of the oxidatively coupled products to ethylbenzene and benzene.

Increased demand for polystyrene in recent years has necessitated increased production of monomeric styrene. The principal industrial source for making styrene is the catalytic dehydrogenation of ethylbenzene. Therefore, a continuous and large supply of ethylbenzene is necessary to insure an adequate supply of styrene. The chief known method of producing ethylbenzene is the reaction of benzene and ethylene in the presence of a Friedel-Craft-type catalyst. Some ethylbenzene is also produced by the superfractionation of mixed $C_8$ aromatic hydrocarbons derived from BTX (benzene, toluene and xylene) fractions. However, the reaction of benzene and ethylene in the presence of a Friedel-Craft-type catalyst is probably the major, if not the principal industrial source of production of ethylbenzene.

It is evident therefore that continued supply of ethylbenzene depends upon the availability of both benzene and ethylene in sufficient quantities. However, ethylene has been used extensively in the manufacture of some basic chemicals (e.g., ethylene oxide) and plastics (e.g., polyethylene). Accordingly, the trend appears to be toward higher consumption of available ethylene for other industrial processes and therefore less availability for the manufacture of ethylbenzene.

The availability of benzene has also become somewhat limited. Only a limited amount of benzene is available from BTX fractions. The supplemental source of benzene has been the hydrodealkylation of toluene. However, this hydrodealkylation reaction is accompanied by loss of the methyl group to methane which is a low value by-product. Therefore, the production of benzene by this route is of marginal economic interest.

Accordingly, this invention provides an alternate and unique process for producing both ethylbenzene and benzene from toluene as the starting hydrocarbon raw material. The only other major raw material which is required is oxygen or a source of oxygen under the reaction conditions.

Basically, and in its broadest aspect, the process of this invention comprises two principal reaction steps. In the first reaction step, two molecules of toluene are coupled using oxygen or an oxygen-producing compound, in the vapor phase, either catalytically or stoichiometrically (as will hereinafter be described), thereby producing stilbene and bibenzyl as the principal products. In the second principal reaction step, both stilbene and bibenzyl are hydrodealkylated to ethylbenzene and benzene as the major hydrodealkylated products. The hydrodealkylation reaction is also conducted in the vapor-phase and in the presence of a unique hydrodealkylation catalyst as will hereinafter be described.

There is no known process at the present time for the production of both ethylbenzene and benzene by the oxidative coupling of toluene to bibenzyl and stilbene and the subsequent hydrodealkylation of bibenzyl and stilbene to ethylbenzene and benzene as the major products. Japanese Patent 22,573/63 discloses a thermal reaction between acetone and toluene to produce a mixture of benzene, styrene, ethylbenzene and xylene.

Belgian Patent 678,573 describes a process of coupling methyl group-containing compounds using oxygen as the coupling agent. The methyl group-containing compounds are represented therein by the formula Y—$CH_3$ wherein Y includes vinyl radical and phenyl groups. However, this patent is not directed to the production of benzene and ethylbenzene, nor is it related to hydrodealkylation of the products of the coupling reaction.

Hydrodealkylation reactions are generally well known as evidenced by the numerous patents and other publications in this field. For example, a general review of hydrodealkylation may be found in an article entitled "Hydrodealkylation," Advances in Petroleum Chemistry and Refining, vol. IX, Inter-Science Publishers, 1964, p. 4 and a similar review is also found in an article entitled "Naphthalene From Petroleum," Advances in Petroleum Chemistry, vol. X, Inter-Science Publishers, 1965, p. 219.

A recent Netherlands Patent No. 6608758 discloses a dealkylation process which employs a catalyst consisting of solid particles of non-acidic carrier material containing an active component selected from Group VI or VII of the Periodic Tablets of Elements. U.S. 3,062,903 issued Nov. 6, 1962 discloses that bibenzyl may be catalytically cracked in the absence of added hydrogen and in the presence of silica-alumina catalyst to produce a mixture of benzene and styrene. However, this patent does not disclose the use of a hydrogenation component (which as will hereinafter be explained constitutes an essential ingredient of the catalyst used in the second principal reaction step of the process of this invention), nor does it require the presence of hydrogen during the cracking reaction. Furthermore, the principal products produced in the process described in this patent are benzene and styrene at approximatley 2:1 weight ratio. Little or no ethylbenzene is produced during this reaction.

The coupling of toluene using elemental sulfur as the coupling agent has been reported by Renard Bull. Soc. Chem., 3, 958 (1889); 5, 278 (1891) and the types of products produced by such coupling reactions have been discussed by Horton, J. Org. Chem., 14, 761 (1949). Thus, while there are some available literature relating to the coupling of toluene using elemental sulfur as the coupling agent, similar information relating to the oxidative coupling of toluene is relatively meager.

It has now been discovered that ethylbenzene and benzene may be produced by the oxidative coupling of toluene to stilbene and bibenzyl followed by the hydrodealkylation of the resulting stilbene and bibenzyl. Ethylbenzene and benzene will thus constitute the major ultimate products of this process.

The first principal reaction step of the process of this invention involves the oxidative coupling of toluene to stilbene and bibenzyl, catalytically or stoichiometrically.

In the catalytic reaction, oxygen or an oxygen-containing gas such as air is reacted with toluene in the presence of a catalyst such as bismuth oxide ($Bi_2O_3$), lead oxide (PbO), tellurium oxide ($TeO_2$), barium peroxide ($BaO_2$), thallium oxide ($Tl_2O_3$) or cadmium oxide (CdO), or any mixture thereof. It has been found that bismuth oxide and tellurium oxide are particularly well-suited for the instant coupling reactions and therefore constitute the preferred catalyst for this step.

In the stoichiometric reaction, toluene is contacted with a compound which serves as the source of oxygen under the reaction conditions. These compounds are the metal oxides heretofore mentioned in connection with the description of the catalytic reaction step. Once again, it has been discovered that bismuth oxide and tellurium oxide are particularly effective sources of oxygen in the stoichiometric reaction step.

In both the catalytic as well as the stoichiometric reactions, the catalyst may, if desired, be supported on an inert material such as Filtros, Aloxite, silicon carbide, and the like. Any mixture of these materials may be employed if desired.

The coupling reaction of toluene to produce stilbene and bibenzyl will now be illustrated by the following three examples.

EXAMPLES 1-3

The experimental procedure and the apparatus employed were the same in all examples. The apparatus comprised a reactor equipped with thermocouples, water-cooled condenser, brine-cooled condenser, gas sample bottle and a wet test meter. The reactor was 1.25 inches I.D. glass tube, 30 inches long having a side tube integrally attached thereto at its upper section. The reactor was packed with a bottom layer of Filtros, several inches of bismuth oxide ($Bi_2O_3$) supported on Filtros and finally a top layer of several inches of Filtros terminating adjacently below the side tube. The reactor was jacketed with an electric furnace and was provided with a thermowell extending along the reactor and containing thermocouples for measuring the temperature in the catalyst section.

The catalyst was prepared by slurrying 100 grams of $Bi_2O_3$ (commercial c.p. grade) with 100 cc. of Filtros and slowly drying the resulting slurry with agitation in an evaporaintg dish. The resulting supported catalyst was then charged to the reactor as aforesaid.

Toluene and air were introduced into the reactor through the side tube at the rates indicated in Table I. Water was also introduced into the reactor separately through said side tube in order to control the reaction temperature and avoid or minimize hot spotting in the catalyst.

Toluene and water were pumped into the reactor and vaporized in the top Filtros layer which was sufficiently preheated to permit their essentially complete vaporization. The reactions were conducted at atmospheric pressure in all three examples and at 580° C., 618° C., and 620° C., in Examples 1, 2, and 3, respectively. The corresponding contact times were 0.93 second, 0.56 second and 2.78 seconds. These contact times were calculated on the basis of an assumed 50 percent void volume in the catalyst section.

The reactor effluent in each case was first condensed in the water condenser where unreacted toluene, water, bibenzyl and stilbene were condensed and collected. The uncondensed vapors were condensed in the brine-cooled condenser and the condensate recovered therein was added to the previous condensate. The remaining uncondensed vapors were then passed through the gas sample bottle and the wet test meter.

After the removal of water and unreacted toluene from the condensate, the composition of the residue was determined by vapor-phase chromatography. The experimental conditions as well as the results obtained in these examples are shown in Table I below.

TABLE I

| | Example 1 | Example 2 | Example 3 |
|---|---|---|---|
| Catalyst temperatures, ° C | 580 | 618 | 620 |
| Catalyst volume, cc | 50 | 50 | 200 |
| Toluene feed rate, moles/hr | 0.16 | 0.09 | 0.09 |
| Air feed rate, moles/hr | 0.42 | 0.43 | 0.43 |
| Water feed rate, moles/hr | 0.63 | 1.70 | 1.29 |
| Contact time, seconds | .93 | .56 | 2.78 |
| Outlet, $O_2$, percent | 11.0 | 6.8 | .5 |
| Bibenzyl, wt. percent of coupled prod | 78.7 | 61.2 | 43.4 |
| Stilbene, wt. percent of coupled prod | 21.3 | 38.8 | 56.6 |
| Yield, wt. percent | 3.85 | 8.0 | 12.9 |

Although the yields obtained in the foregoing examples appear rather low, it must be pointed out that these yields are on single pass basis. Higher yields can be achieved by recycling the unreacted toluene to the reaction zone.

It will also be noted from the foregoing table that higher yields are obtained at longer contact time. This is clearly evident from a comparison of the contact times and their corresponding yields in Examples 2 and 3.

As was previously discussed, bismuth oxide and tellurium oxide, particularly the former, constitute the preferred catalyst for the first principal reaction step of the process of this invention. Example 4 below illustrates that bismuth oxide retains its catalytic activtiy over a long period of time.

EXAMPLE 4

The experimental procedure and apparatus employed in this example were the same as in the previous examples. The catalyst was bismuth oxide supported on Filtros prepared as described in Example 1.

Toluene and air were introduced to the reactor at 0.374 mole of oxygen per mole of toluene. the reaciton was carried out at 618° C., atmospheric pressure and contact time of 2.3 seconds. The reactor effluent was treated as in the foregoing examples. Analysis of the reaction products indicated a toluene conversion of 16 weight percent after 25 days of operation indicating that the catalyst had substantially retained its catalytic activity after such a long period of operaion.

The first principal reaction step, whether conducted catalytically or stoichiometrically, may be carried out at subatmospheric, atmospheric or superatmospheric pressure per se is not critical in this step. Since the reactor employed in the foregoing examples was made of glass, the coupling reaction was conducted at atmospheric pressure. Higher pressures may be employed by conducting the reaction in a reactor constructed from ordinary materials of construction.

The temperature of the coupling reaction depends on whether the reaction is catalytic or stoichiometric. Catalytic reaction is usually preferred and is generally conducted at a temperature of from about 350° C. to about 700° C., preferably from about 550° C. to about 650° C. If the reaction is carried out stoichiometrically the temperatures employed are generally lower than the temperature required for the catalytic reaction. Thus, in stoichiometric operation the temperature can vary from about 200° C. to about 400° C. or even higher.

The contact time of materials in the catalyst section depends, in part, upon the reaction temperature and the desired toluene conversion level. In general, shorter contact times are required at higher temperatures and lower toluene conversion level. Thus the contact time can generally vary from about a fraction of a second to about one minute and is preferably from about 0.1 second to about 10 seconds.

It is generally desirable to use less than one mole of oxygen per mole of toluene in the coupling reaction. However, the oxygen-to-toluene mole ratio can generally vary from about 0 (as in stoichiometric operation) to about 10 moles of oxygen per mole of toluene and is preferably from about 0.25 to about 1.25 moles of oxygen per mole of toluene.

Water may be added to the reaction zone in order to facilitate the control of the reaction temperature and to avoid hot spot formation in the catalyst section. The amount of water employed depends upon the reaction conditions and is generally determinable by those skilled in the art.

The first principal reaction step in the process of this invention may be conveniently carried out in a single reactor as well as multiple reactors using fixed-bed or even a fluid-bed system if desired. The catalyst may be periodically regenerated to regain any of its lost activity. The regeneration of the catalyst may be accomplished by any of the known procedures such as by burning with air, and the like.

As was previously indicated, the second principal reaction step in the process of this invention involves the hydrodealkylation of the oxidatively coupled products to produce ethylbenzene and benzene as the major hydrodealkylated products. Thus, the entire product from the coupling reaction may be subjected to the hydrodealkylation reaction. However, from the standpoint of improved and economical operation, it is usually desirable, and in fact preferable to remove any unreacted toluene from the products of the coupling reactioin by distillation or other known procedures. Water produced during the reaction is also similarly removed so that the product feed to the hydrodealkylation step comprises mainly of stilbene and bibenzyl. Thus, while the feed to the hydrodealkylation step of the process of this invention may comprise the entire oxidatively coupled products, preferably this feed is basically a mixture of stilbene and bibenzyl.

The hydrodealkylation reaction is carried out by diluting said feed with a suitable diluent, e.g., benzene, and passing the diluted feed through a hydrodealkylation zone containing a suitable hydrodealkylation catalyst and effecting the conversion to ethylbenzene and benzene under hydrodealkylation conditions. Although other diluents such as toluene and xylene may be employed to dilute the feed, benzene is preferably used for this purpose since the ultimate desired products are ethylbenzene and benzene. For example, if toluene is used as the diluent, the resulting hydrodealkylated products will contain substantial quantity of methylethylbenzene which is an undesirable product for the purpose of this invention. Ethylbenzene and benzene constitute the major hydrodealkylated products only when benzene is employed to dilute said feed.

It must be further emphasized that as a practical matter, the hydrotreating reaction is most advantageously carried out in the presence of diluent, i.e., benzene. Otherwise, transalkylated products such as diethylbenzene and ethylbibenzyl will be produced which will detract from the yields of the more desirable ethylbenzene and benzene. Thus, the weight ratio of the diluent to said feed can vary from about 0 to about 10:1 but is preferably from about 1:1 to about 5:1. The ratio of zero obviously corresponds to those operations in which a diluent is not employed.

The catalysts employed in the hydrodealkylation step are uniquely suitable for this purpose. Although hydrodealkylation catalysts per se are known, not all of these catalysts have been found to be suitable or effective for the instant hydrodealkylation reaction. In fact, it has been found that only catalysts possessing certain unique characteristics can be effectively employed in the hydrodealkylation of stilbene and bibenzyl in order to produce ethylbenzene and benzene as the major projects of the hydrodealkylation reaction.

Basically, the catalysts which are uniquely suitable for the second principal reaction step of the process of this invention consist of a hydrogenation component and an active acidic component generally used as a support for the hydrogenation components. The hydrogenation component of the catalyst is chromium oxide ($Cr_2O_3$), vanadium oxide ($V_2O_5$) or tungsten oxide ($WO_3$) or any mixture of these oxides. Chromium oxide has been found to be particularly well suited for this purpose and therefore constitutes the preferred hydrogenation component of this catalyst.

The active, acidic component of the catalyst generally constitutes a support for the hydrogenation component. Exemplary such acidic materials include silica-alumina, metal-exchanged and/or decationized molecular sieves, acid-treated bentonite-type clay, acid, treated kaolinite-type clay, alumina-boria, magnesia-silica, boron phosphate, or many mixture thereof. These materials may be used in graular or pelletized forms, if desired. The exact form and configuration and the particle size of these supports are not per se critical as far as this invention is concerned.

The hydrogenation component is either impregnated into the active, acidic material or it is otherwise adsorbed thereon by any of the conventional methods. The amount of the hydrogenation component in the catalyst must be sufficient to promote complete saturation of the double bonds formed during the hydrodealkylation reaction. The optimum amount of the hydrogenation components depends, to a large extent, upon the active, acidic ingredient which is employed. In general, satisfactory catalytic performance is realized when the catalyst contains from about 5 to about 40 weight percent, preferably from about 10 to about 25 weight percent of hydrogenation component based on the total weight of the finished catalyst.

The hydrodealkylation step can be carried out continuously, semicontinuously or in batchwise fashion. In continuous operation the feed (basically stilbene and bibenzyl) is first diluted with benzene and the diluted mixture and hydrogen are thereafter passed through a hydrodealkylation zone while continuously removing the hydrodealkylated products therefrom. Stilbene is immediately converted to bibenyl in this zone and the resulting bibenzyl is hydrodealkylated to ethylbenzene and benzene. The reactor affluent may be distilled to recover benzene, ethylbenzene and toluene and the remaining material containing mostly unconverted bibenzyl is recycled to the reaction zone.

It has been discovered that the temperature at which the instant hydrodealkylation reaction can be carried out is significantly less than the temperatures heretofore employed in conventional industrial hydrodealkylation processes. In fact if such conventional hydrodealkylation temperatures are employed, considerable amount of toluene will be produced by the thermal decomposition of bibenzyl. The production of toluene in the present hydrotreating reaction is of course undesirable since the ultimate desired products are ethylbenzene and benzene, particularly the former. In general, it has been found that the second principal reaction step of the process of this invention can be conveniently effected at a temperature of from about 300° C. to about 500° C., preferably from about 350° C. to about 450° C.

The pressure in the hydroealkylation reaction is not per se critical. It is generally advantageous to carry out the reaction at super-atmospheric pressures which may be as high as about 2000 p.s.i.g., or even higher. However, such higher pressures are neither economical nor contribute to the overall efficiency of this reaction step.

The liquid hourly space velocity of the feed (diluted mixture) to the hydrodealkylation reaction zone can vary from about 0.1 to about 10, preferably from about 1 to about 5 depending upon the other reaction conditions.

The hydrogen-to-hydrocarbon mole ratio can also vary depending upon the other reaction conditions and is generally from about 2:1 to about 30:1, preferably from about 4:1 to about 20:1 moles of hydrogen per mole of hydrocarbon. The term "hydrocarbon" in this context refers to the diluted feed to the hydrodealkylation reaction zone.

The ethylbenzene and benezene produced by the foregoing hydrodealkylation reaction may be separated from the other reaction products by distillation, extraction, absorption or other conventional procedures. Unreacted bibenzyl, together with other products excluding benzene. ethylbenzene and toluene may be recycled to the hydrodealkylation zone for further treatment.

The hydrodealkylation of bibenzyl will now be illustrated by the following example. The feed in this example did not contain stilbene since stilbene, as was previously mentioned, is readily converted to bibenzyl in the hydrodealkylation step and it is the latter which is in fact hydrodealkylated to ethylbenzene and benzene.

EXAMPLE 5

The apparatus employed in this example comprised a reactor, a liquid-vapor separator, pressure traps, an atmospheric trap and their associated instruments. The reactor was a one-inch schedule 80 stainless steel pipe, 32 inches long. It was unpacked at its upper section, followed by several inches of inert Filtros, several inches of catalyst and finally several inches of Filtros at the bottom.

The catalyst was silica-alumina impregnated with chromia. It was prepared by impregnating dried silica-alumina with an aqueous solution of chromium trioxide ($CrO_3$) which was reduced with hydrogen to chromium oxide ($Cr_2O_3$). The resulting finished catalyst contained 16 weight percent chromium oxide based on the total weight of the catalyst.

The feed to the reactor was bibenzyl diluted with three times its weight of benzene. The diluted mixture was pumped to the top of the reactor at the rate of 90 cc. per minute along with hydrogen which was separately introduced to the top of the reactor at the rate of 11.5 cubic feet per hour. Hydrogen which was preheated to 200° C. passed downwardly through the reactor with the diluted feed and the reaction was conducted at 425° C. and 400 p.s.i.g.

The reactor effluent was introduced into the liquid-vapor separator which was maintained under pressure and at 25° C. The uncondensed vapors from the liquid-vapor separator were condensed in a series of pressure traps and finally in a cold trap maintained at −78° C. The composition of the liquid product was determined by vapor-phase chromatography as shown in Table II below.

TABLE II

| Compound: | Weight percent [1] |
| --- | --- |
| Benzene | 10.82 |
| Toluene | 1.63 |
| Ethylbenzene | 8.25 |
| Methylethylbenzene | 0.18 |
| Diethylbenzene | 0.44 |
| Triethylbenzene | 0.26 |
| Transalkylate | 3.72 |
| Triphenylpropane | 0.11 |
| Tetraphenylbutane | 0.59 |
| Unconverted bibenzyl | 74.00 |
|  | 100.00 |

[1] Determined by vapor-phase chromatography.

It will be noted from Table II that ethylbenzene and benzene constitute the bulk of the products of the reaction. Since this example was a single pass operation considerable amount of bibenzyl remainder unconverted. However, the unconverted bibenzyl along with the other reaction products, excluding benzene, ethylbenzene and toluene, may be recycled to the reaction zone, or introduced into a second hydrodealkylation reaction zone operating in series with the first reactor.

What is claimed is:
1. A process for producing ethylbenzene and benzene from toluene as the starting hydrocarbon material, which process comprises:
  (a) Coupling toluene in the vapor phase, using oxygen as the coupling agent, in the presence of an oxide of bismuth, tellurium, thallium, lead, barium or cadmium, or any mixture of said oxides,
  (b) effecting said coupling reaction under oxidative coupling conditions to produce bibenzyl and stilbene,
  (c) recovering said bibenzyl and stilbene from the products of the oxidative coupling reaction and diluting the same with from about 0 to about 10 times its weight of benzene,
  (d) passing said diluted mixture and hydrogen through a hydrodealkylation zone containing a catalyst comprising essentially a hydrogenation component and an active acidic component, said hydrogenation component being chromium oxide, tungsten oxide or vanadium oxide, or any mixture thereof, and said active acidic component being silica-alumina, metal-exchanged and/or decationized molecular sieves, acid-treated bentonite-type clays, acid-treated kaolinite-type clays, alumina-boria, magnesia-silica or boron phosphate, or any mixture thereof,
  (e) effecting said hydrodealkylation reaction at a temperature of from about 300° C. to about 500° C., a liquid hourly space velocity of from about 0.1 to about 10 and a hydrogen-to-hydrocarbon mole ratio of from about 2:1 to about 30:1, and
  (f) recovering ethylbenzene and benzene from the hydrodealkylated products.

2. The process of claim 1 wherein the weight ratio of benzene to stilbene and bibenzyl is from about 1:1 to about 5:1.

3. The process of claim 1 wherein the hydrogenation component of said catalyst is chromium oxide and said active, acidic component is silica-alumina.

4. The process of claim 2 wherein the hydrogenation component of said catalyst is chromium oxide and said active, acidic component is silica-alumina.

5. The process of claim 1 wherein said hydrodealkylation reaction is carried out at a temperature of from about 350° C. to about 450° C., a liquid hourly space velocity of from about 1 to about 5 and a hydrogen-to-hydrocarbon mole ratio of from about 4:1 to about 20:1.

6. The process of claim 2 wherein said hydrodealkylation reaction is carried out at a temperature of from about 350° C. to about 450° C., a liquid hourly space velocity of from about 1 to about 5 and a hydrogen-to-hydrocarbon mole ratio of from about 4:1 to about 20:1.

7. The process of claim 3 wherein said hydrodealkylation reaction is carried out at a temperature of from about 350° C. to about 450° C., a liquid hourly space velocity of from about 1 to about 5 and a hydrogen-to-hydrocarbon mole ratio of from about 4:1 to about 20:1.

8. The process of claim 4 wherein said hydrodealkylation reaction is carried out at a temperature of from about 350° C. to about 450° C., a liquid hourly space velocity of from about 1 to about 5 and a hydrogen-to-hydrocarbon mole ratio of from about 4:1 to about 20:1.

References Cited

UNITED STATES PATENTS

| 2,338,973 | 1/1944 | Schmerling | 260—668 |
| 2,614,130 | 10/1952 | Pines et al. | 260—670X |
| 3,062,903 | 11/1962 | Odioso et al. | 260—668 |
| 3,373,217 | 3/1968 | Englebrecht et al. | 260—668 |
| 3,428,700 | 2/1969 | Cyba | 260—668X |

FOREIGN PATENTS

| 1,473,718 | 2/1967 | France. |

CURTIS R. DAVIS, Primary Examiner

U.S. Cl. X.R.

260—670